E. F. LEE.

Button Fastenings.

No. 5,403. Reissued May 13, 1873.

*Witnesses:*

Fred Haynes

D. Hewitt

E. F. Lee by his Attorney

Brown & Allen

A.M. PHOTO-LITHOGRAPHIC CO. N.Y. (OSBORNE'S PROCESS.)

UNITED STATES PATENT OFFICE.

EDWIN F. LEE, OF BAYONNE, NEW JERSEY, ASSIGNOR OF ONE-THIRD INTEREST TO JOSEPH WIENHOLD, OF NEW YORK CITY.

IMPROVEMENT IN BUTTON-FASTENINGS.

Specification forming part of Letters Patent No. 109,134, dated November 8, 1870; reissue No. 5,403, dated May 13, 1873; application filed March 27, 1873.

*To all whom it may concern:*

Figure 1:
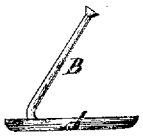
Figure 2:
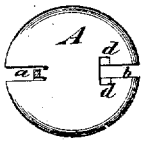
Figure 3:
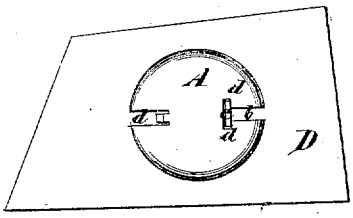
Figure 4:
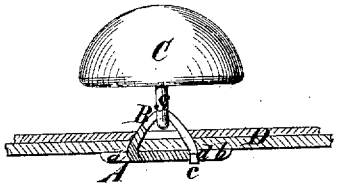

Be it known that I, EDWIN F. LEE, formerly of New York, but now of Bayonne, in the county of Hudson and State of New Jersey, have invented an Improvement in Button-Fastening, of which the following is a specification:

Figure 1 represents a side view of my improved button fastening before the same is closed in its attachment of the button. Fig. 2 is a plan or back view thereof. Fig. 3 is a like view of the same after the tongue of the fastening has been secured with its free end to the disk of the fastening. Fig. 4 is a partly-sectional side view of the fastening under the conditions described in Fig. 3.

Similar letters of reference indicate corresponding parts in all the figures.

This invention relates to a new button-fastening, which is made in a single piece of metal, comprising a disk and tongue, the latter projecting from one side of the disk, and so arranged that it may be bent to occupy an angular position relatively to the face of the disk, for projection through the material to which the button is to be attached, and for being passed through the shank of the button for return through the material and to lock with the disk. A button-fastener thus composed of a disk and tongue in one piece is cheap and efficient, and may be readily applied without the aid of special tools, and found advantageous for the fastening of all kinds of buttons to all kinds of materials.

Referring to the accompanying drawing, the letter A represents a head or disk, made of metal, or other suitable material which combines the requisite thickness and flexibility. From the edge of said disk projects a tongue, B, which is made in one piece with said disk, and can be bent to incline or project from the face of the disk, in the manner indicated in Fig. 1.

To apply the fastening to a button, C, for the purpose of holding the latter to one or more thicknesses of material, D, the tongue B is projected through the material from the back or inner side, and after being passed through the shank of the button is again put through the material and reconnected at its free end with the disk. This connection may be effected by providing a notch or slot, *b*, in the disk A, and in passing the free end of the tongue B through such notch or slot, in the manner indicated in Fig. 4; and the said end of the tongue is enlarged to fit a recess, *d*, in the disk, as shown.

A close fit of the disk against the material is effected by this fastening, and also a secure hold to the button, with freedom of play to the latter to facilitate buttoning.

The tongue B might be made of a separate piece from the disk, and welded or soldered to the latter; but this is not as desirable as making it part of the same piece with the disk.

What I claim as my invention, and desire to secure by Letters Patent, is—

A button-fastening composed of a disk, A, and tongue B, made in one piece, said tongue having an enlargement at its free end to fit a recess in the disk, for operation substantially as described.

EDWIN F. LEE.

Witnesses:
A. V. BRIESEN,
J. WIENHOLD.